C. F. ZINN.
INDICATOR.
APPLICATION FILED JULY 31, 1913.
1,153,530. Patented Sept. 14, 1915.
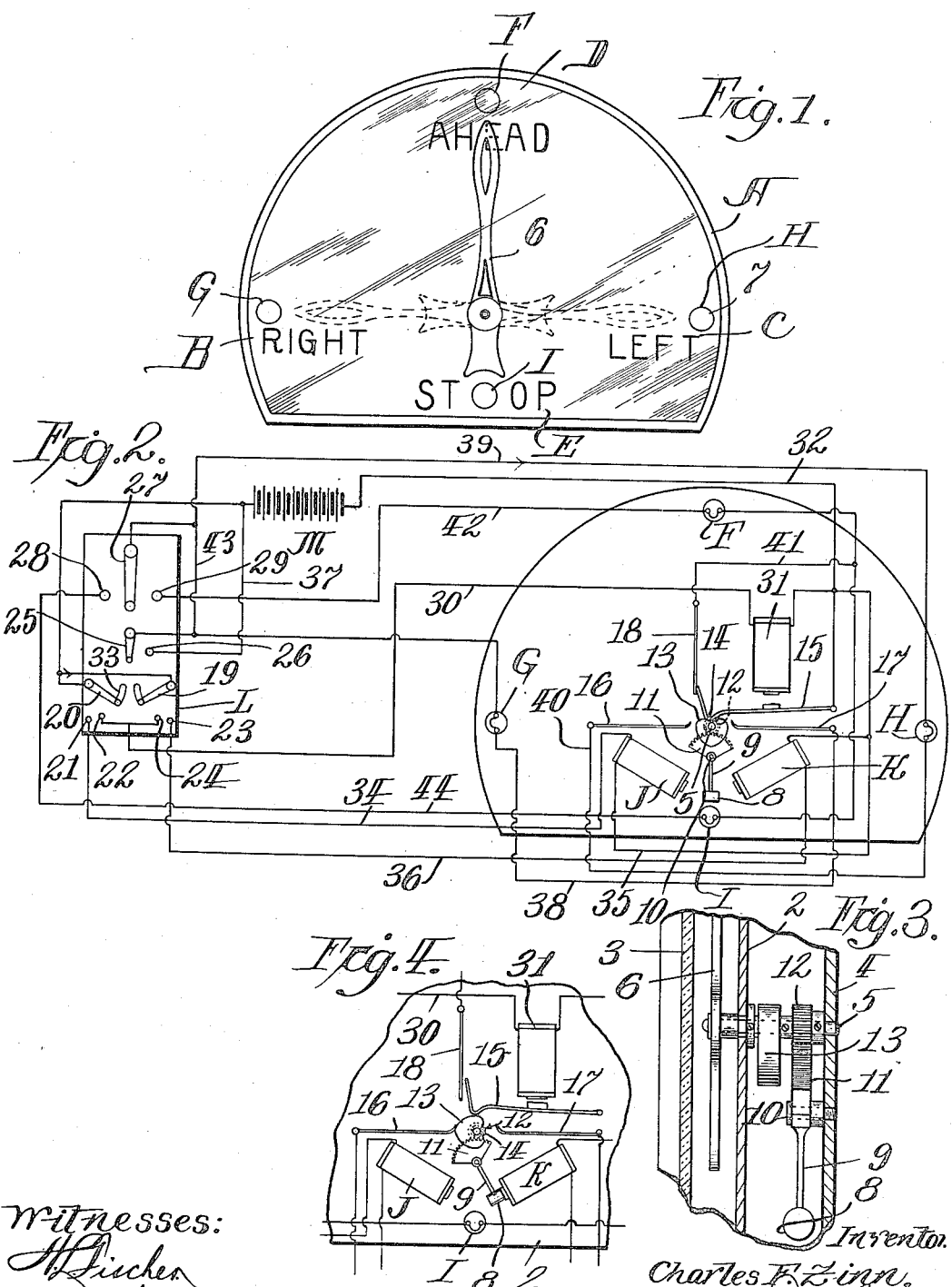

UNITED STATES PATENT OFFICE.

CHARLES F. ZINN, OF ST. PAUL, MINNESOTA.

INDICATOR.

1,153,530.  Specification of Letters Patent.  Patented Sept. 14, 1915.

Application filed July 31, 1913. Serial No. 782,362.

*To all whom it may concern:*

Be it known that I, CHARLES F. ZINN, a citizen of the United States, residing at St. Paul, in the county of Ramsey and State of Minnesota, have invented a new and useful Improvement in Indicators, of which the following is a specification.

This invention relates to an indicator which is adapted for signaling from a moving vehicle and announcing any deviation from the direction of drive hitherto taken, also indicating any sudden stoppage or procedure of the vehicle.

An object of this invention is to associate with the above features visible signaling means for use in the light or dark and adapted to indicate four directions.

A further object is to provide means whereby the pointer on the signaling device is held steady when in any of its signaling positions, so that a following driver or a traffic officer is notified in an unmistakable manner the direction of the drive of the vehicle.

Coupled with these features my invention provides a simple and inexpensive apparatus which may be easily applied to a vehicle without inconvenience.

My invention further provides a signaling apparatus which may be easily operated either by foot or hand.

In the accompanying drawing forming part of this specification, Figure 1 is a front view of my improved indicator, which is adapted to be mounted on the front or back of a vehicle; Fig. 2 is a diagrammatic view of my invention illustrating the construction by which one of the indicators is adapted to be operated; Fig. 3 is a detail illustrating the mechanical construction of the indicator, whereby the pointer is held steady when in median position, and Fig. 4 is a detail illustrating the position the parts assume when the signal is given to indicate that the vehicle is about to turn.

In the drawing A indicates a suitable casing in which is mounted the mechanism constituting one of the indicators, said casing being provided with a dial face 2 and a transparent cover 3. Centrally disposed through the casing, mounted upon its back 4 and passing through the dial face is a shaft 5, which carries the pointer arm 6, said shaft being journaled so as to swing said arm into three positions, two of which are horizontal indicating "right" or "left," and the other one median position which is illustrated by full lines in Fig. 1, indicating "ahead." These positions are respectively marked B, C and D in Fig. 1. At the lower portion of the dial there is a fourth position indicating "stop," and marked E. Adjacent each of these four markings there is a visual signal in the form of electric lamps, F, G, H and I, one being mounted in the casing immediately adjacent each of the direction indications B, C, D and E. The mode of actuating the pointer 6 is by means of a pair of electromagnets J and K and an armature 8, which is disposed to be influenced by the cores of said magnets. This armature is mounted upon a depending rod 9, pivoted upon the stud 10 carried upon the back of the casing. The upper portion of this rod is connected to a toothed quadrant 11, the teeth of which are adapted to mesh with the teeth of a pinion 12 carried by the shaft 5. When either of the magnets J and K is energized the armature 8 is moved to rotate the shaft 5 and turn the pointer 6 into horizontal position indicating either right or left according to which magnet is energized. In order to hold the pointer 6 in median position which indicates ahead, its lower end is weighted and a cam 13 is mounted upon the shaft 5 and a shoulder 14 on a spring 15 mounted in the casing is urged downwardly into the crease or indenture of the cam. The spring 15 urging the shoulder 14 downwardly against the edge of the cam tends to hold the indicating arm 6 in median position automatically whenever said arm is moved toward right or left positions and steadies the pointer 6 against vibration or jarring due to the operation of the vehicle. Thus whenever either of the electromagnets J or K is deënergized the spring 15 immediately returns the pointer 6 into "ahead" position automatically.

The cam 13 performs the function of a commutator for electric current passing through coöperating contact arms 16 and 17 and the spring 15, which causes the free end of spring 15 to make and break the contact with an electrical conducting arm 18 against the free end of which the tip of spring 15 normally impinges. The arms 16, 17 and 18 are also in the form of springs mounted upon the indicator structure. Normally the free ends of arms 16 and 17 are out of contact with the surface of the cam, but when the cam swings from median position its lower end being farthest from the axis of the cam swings into contact with either of the arms 16 or 17 according to which direction the shaft 5 is turned.

Suitable switching apparatus L conveniently located to the driver of the vehicle so that it can be operated either by hand or foot is connected electrically with the actuating parts of the indicator by electrical conductors leading from a source of current supply such as the battery M. The switching apparatus is provided with a pair of switch arms 19 and 20 one being used by the operator to make contact with the points 21 and 22, to cause the pointer to move to "right" position and the other adapted to make contact with the points 23 and 24 when the pointer is made to coincide with "left" position. A main control lighting switch arm 25 is provided which is adapted to make contact with the point 26 when it is desired to use the indicator in the dark to illuminate the lamps and an auxiliary direction lighting switch arm 27 is provided which is adapted to make contact with either of the points 28 or 29 for illuminating the lamps located at the positions "ahead" and "stop".

Assuming that the indicator is to be used in daylight, it is not necessary to illuminate the lamps, the switch arms 25 and 27 being thrown into open position as illustrated in Fig. 2. While in this condition the pointer remains in median position coinciding with the station "ahead". If the driver wishes to signal that he is about to turn to the right, the switch arm 20 is thrown in contact with the points 21 and 22, the first portion of the movement causing said arm to form a circuit through the point 22 and the final part causing said arm to form a connection with both points 21 and 22. When making contact with point 22 only, it completes a circuit leading from the battery through the wire 30, the coil of electromagnet 31 and back to the battery through wire 32 thus energizing magnet 31 and attracting the spring arm 15, which forms an armature of said magnet, into raised position, lifting its shoulder 14 out of the notch of the cam 13 and the tip of arm 15 out of contact with arm 18. Both of the switch arms 19 and 20 are formed with rearward extensions 33, each of which is adapted to cover both of the contact points with which its adjacent switch arm is adapted to coöperate. Following the completion of the circuit as described, another circuit leading from the battery is made through the wire 34, the coil of the electromagnet J, wire 35 and wire 32, back to the battery, thus energizing magnet J and attracting the armature 8, and turning the pointer into one of the broken line positions indicated in Fig. 1 coinciding with "right". When the switch arm 20 is returned into open position the parts return into normal position, the spring 15 assisting as the pointer approaches median position and engaging in the notch of the cam. The free end of either of the springs 16 or 17, bearing against the periphery of the cam 13 also assists during the early portion of the movement of the cam in returning the pointer and shaft 5 into normal position.

When it is desired to indicate that the vehicle is about to proceed to the left, the switch arm 19 is closed over the point 24 and then the point 23. During the first step of this operation a circuit is completed from the battery through the wire 30, electromagnet 31 and wire 32 back to the battery, energizing the magnet 31 and again lifting the spring 15 out of locked position with the cam and out of contact with the arm 18. The following step completes a circuit from the battery through contact point 23, wire 36, the coil of electromagnet K and the wire 32 back to the battery, thus energizing the magnet K, attracting the armature 8, turning the pointer down into one of the broken line positions indicated in Fig. 1, to coincide with the station "left." When the switch arm 19 is moved into open position the indicator arm 6 returns into median position as before. As it is unnecessary to indicate in daylight that the vehicle is about to stop no station is provided for the pointer to indicate such a position.

If the indicator is used when it is dark, the switch arm 25 is closed upon the contact point 26, and in this position whenever the switch arms 19 and 20 are closed over their respective contact points the lamps are illuminated simultaneously at each station, corresponding with either position of the indicator namely at right or left. When the pointer is thrown into the position "right" a shunt circuit is formed from the battery through wire 37, switch arm 25, lamp G, wire 38, arm 17, cam 13, spring 15 and wire 32 back to the battery to illuminate the lamps and when the switch arm 19 is closed over the contact points 23 and 24 the shunt circuit is completed through the wire 37, the switch arm 25, wire 39, lamp H, wire 40, arm 16, cam 13, spring 15 and wire 32 back to the battery thus illuminating lamp H.

When in median position the pointer 6 remains over station "ahead" and the switch arm 27 is moved upon contact point 29 whereupon a circuit is completed through wire 32, spring 15, arm 18, wire 41, lamp F, wire 42, switch arm 27, wire 43, switch arm 25 and wire 37, back to the battery, thus illuminating the lamp F. When it is desired to indicate that the vehicle is about to stop the switch arm 27 is moved upon contact point 28, whereupon a circuit is completed from the battery through wire 32, spring 15, arm 18, wire 41, wire 44, switch arm 27, wire 43, switch arm 25 and wire 37 back to the battery whereupon signal lamp I is illuminated.

It is contemplated to employ any suitable switching device for causing the operation of the circuits in the manner described within the spirit of my invention, and it is further contemplated that two or more indicators such as described may be used in coöperation with the circuits as set forth, the duplicate indicators being connected in multiple with the various branches, so that a single switching device can be made to operate two or more indicators placed at the rear or front ends of a vehicle or in any other position, simultaneously.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An indicator for signaling directions in which a vehicle is adapted to move, comprising a dial having a signaling arm, a shaft journaled in said dial and carrying said arm, an armature operatively connected with said shaft in position when influenced magnetically to turn said shaft in either direction, a pair of electromagnets associated with said armature to turn said shaft, an electric circuit in which the coils of said magnets are included adapted to energize either of said magnets according to the right or left direction the vehicle is adapted to move, means for holding said shaft with its arm in median position but permitting it to be turned when said armature is influenced by either of said magnets, auxiliary illuminating signals on said dial, an electrical circuit in which said auxiliary signals are included and a switch with which said circuits are connected adapted to cause the movement of said arm and the operation of said illuminating signals in synchronism.

2. A direction indicator comprising, in combination, a casing having a dial, a shaft journaled in said casing, said shaft having a pinion mounted thereon, a signaling arm carried by said shaft, a stud mounted in said casing, a rod pivotally supported by said stud and having a toothed quadrant meshing with the pinion on said shaft, an armature carried by said rod, electromagnets associated with said armature to turn said shaft, an electric circuit adapted to energize either of said magnets, illuminating signals on said dial, an electric circuit in which said signals are included, and a switch for connecting said circuits to actuate said arm and said signals in synchronism.

3. A direction indicator comprising in combination, a casing having a dial, a shaft journaled in said casing, a signaling arm carried by said shaft, an armature operatively connected with said shaft, a pair of electro-magnets associated with said armature to turn said shaft, means for locking said shaft in median position and adapted to regulate the movements of said shaft, a single electro-magnet disposed within said casing in juxtaposition to said locking means, and electric circuits in which all of said magnets are included, said circuits being provided with a switch by means of which said single magnet is initially energized to release said locking means and either of said pair of magnets subsequently energized to attract said armature and turn said shaft.

4. A direction indicator comprising in combination, a casing having a dial provided with spaced markings thereon, an illuminating signal disposed adjacent each marking, a shaft journaled in said casing, a signaling arm carried by said shaft, an armature operatively connected with said shaft, a pair of electro-magnets associated with said armature, spring means for locking said shaft in median position and adapted to steady the movements of said shaft, a single electro-magnet disposed within said casing in juxtaposition to said locking means, and electric circuits in which all of said magnets and said illuminating signals are included, said circuits being provided with a connecting switch by means of which said single magnet is initially energized to release said locking means and either of said pair of magnets subsequently energized to cause the movement of said arm and the operation of said illuminating signals in unison.

5. The combination with a direction indicator having a dial provided with a signaling arm, of a shaft journaled in said dial and carrying said arm, a cam on said shaft, an armature operatively connected with said shaft, electromagnets associated with said armature to turn said shaft, a spring arm bearing against said cam for steadying the movements of said shaft, an electric circuit adapted to energize either of said magnets, illuminating signals on said dial, independent members adapted to alternately bear against said cam to assist in returning said shaft to median position, an electric circuit in which said spring arm, said members and said signals are included, and a switch for connecting said circuits to actuate said signaling arm and illuminating signals in unison.

6. The combination with a direction indicator having a dial provided with a signaling arm, of a shaft journaled in said dial and carrying said arm, a commutator on said shaft, an armature operatively connected with said shaft, electromagnets associated with said armature to turn said shaft, a spring arm bearing against said commutator for steadying the movements of said shaft, an electric circuit adapted to energize either of said magnets, illuminating signals on said dial, independent spring members adapted to bear against said commutator, electric circuits in which said spring arm, said members and said signals are included, and a switch for connecting all of said circuits to actuate said signaling arm and illuminating signals in unison.

In testimony whereof, I have signed my name to this specification, in the presence of two subscribing witnesses.

CHAS. F. ZINN.

Witnesses:
H. L. FISCHER,
STELLA L. WASCHENBERGER.